Aug. 30, 1927.
M. SCHERR
1,640,520
WEIGHT REGISTERING GAUGE FOR WEIGHING SCALES
Filed May 15, 1926
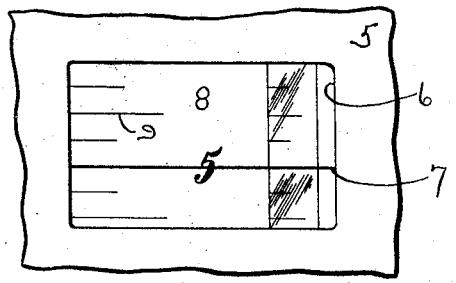
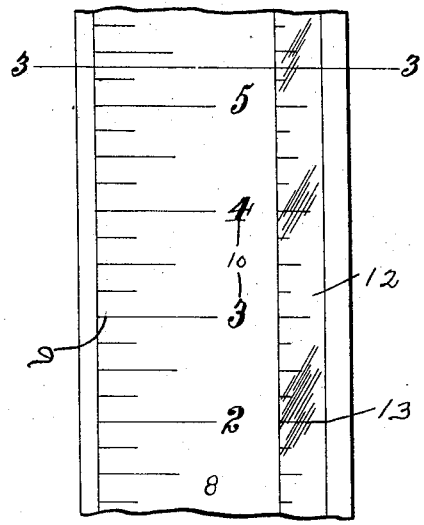
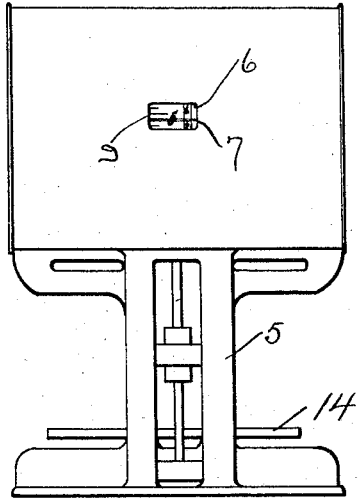
INVENTOR.
Morris Scherr
BY
J. T. Dowling
ATTORNEY.

Patented Aug. 30, 1927.

1,640,520

UNITED STATES PATENT OFFICE.

MORRIS SCHERR, OF BALTIMORE, MARYLAND.

WEIGHT-REGISTERING GAUGE FOR WEIGHING SCALES.

Application filed May 15, 1926. Serial No. 109,316.

This invention relates to certain new and useful improvements in weight registering gauges for weighing scales, and has for its particular object the provision of means carried by the gauge proper whereby the weight on the scale may be quickly and accurately determined.

A further object of this invention is the provision of a reflecting means carried by the weight registering gauge so that the accurate amount weighed may be readily determined by the reflection of the hairline in the reflecting means.

A still further and important object of the invention is the provision of a weight registering gauge of a scale equipped with a mirror or reflecting surface, which may or may not have coinciding graduated lines depicted thereon, so that the hairline of the scale proper may lie directly over the corresponding graduations of the scale and mirror in order that the amount of weight on the scale may be absolutely and accurately determined.

Heretofore in weighing scales having registered graduated gauges, a sort of optical delusion was generally set up making it difficult to determine the amount of weight on the scale, due to the fact that if one looked beneath the hairline of the scale he saw the graduating line on the gauge and if he raised his eyes above the hairline he saw the graduation marks again. Thus it follows, that a person either received too much material or not enough. To overcome this serious objection, I have provided a reflecting surface, such as a mirror or the like, which can have corresponding graduations thereon or they can be left off, the principle being that when the hairline covered the mark on the gauge proper it would have no reflection on the reflecting surface. I mean, when the hairline was in absolute register with the graduated mark of the gauge and the eye was in direct line with the hairline, there would be no reflection above or beneath said hairline, thus determining the accurate amount of material on the scale by weight.

With these and other objects in view, the invention consists in certain novel features, combination and arrangement of parts as will be hereinafter more fully described, illustrated in the accompanying drawing, and claimed.

In the drawing,

Figure 1 is a fragmentary plan view of the weight registering gauge and mirror having depicted thereon registering lines and characters;

Figure 2 is a fragmentary front elevational view of a scale equipped with my improved invention;

Figure 3 is a transverse sectional view taken on the line 3—3 of Figure 1; and,

Figure 4 is a front elevational view of a scale equipped with my improved gauge, as made in accordance with this invention.

Referring more particularly to the drawing, the numeral 5 indicates a weighing scale of one of the usual common type, and it is equipped with a sight opening 6, having a centrally disposed transversely arranged hair or reading line 7, and arranged behind this sight opening 6 of the scale 5, is a weight registering gauge 8, which gauge includes a body having depicted on its outer face, a series of graduation lines 9, some of which are designated by characters 10.

The weight registering member 8 is provided in one longitudinal side edge with a depression or offset portion 11, in which is secured a reflecting member 12, such as a mirror or the like, and this reflecting member may be equipped with graduation lines 13 (this being optional), but when used they correspond to the graduation lines 9 of the member 8, and it will follow that when the scale is assembled, as shown in Figure 4, and material is placed on the weighing shelf 14, the member 8 will be moved by the sight opening 6 until the proper weight is determined by the hairline registering over the character 9 of the member 8, and by virtue of this hairline registering with said character, there will be no reflection of the hairline in the mirror, thus determining accurately the amount of material being weighed.

It is to be clearly understood, that the mirror can have depicted thereon graduation lines corresponding to the graduation lines on the member 8, or they may be left entirely off of the mirror and the same accurate result obtained.

It is also to be understood that applicant is not limiting his invention to any particular structure or type of weight registering gauges and that certain minor features and changes may be resorted to without departing from the spirit and scope of the invention as claimed.

Having thus described my invention, what I claim as new is:

1. In combination with a weighing scale and its mechanism, of a weight registering member comprising a body having depicted thereon graduation marks and characters, and a reflecting member carried by said body and having corresponding marks and characters thereon.

2. A scale of the class described including the combination with a weight registering gauge having depicted thereon graduations and characters, of a reflecting member, means formed in said body of the gauge to receive said reflecting member, and graduations formed on said reflecting member coinciding with the graduations of said gauge for the purpose specified.

3. The combination with a weight registering gauge, of a weighing scale comprising a body, of a reflecting member secured to said body, and coinciding weight registering characters carried by said body and reflecting member.

In testimony whereof he hereunto affixes his signature.

MORRIS SCHERR.